US005149070A

United States Patent [19]

Dykstra

[11] Patent Number: 5,149,070

[45] Date of Patent: Sep. 22, 1992

[54] EDGE CLAMP

[75] Inventor: Henry Dykstra, Milford, Mich.

[73] Assignee: Delaware Capital Formation, Inc., Wilmington, Del.

[21] Appl. No.: 698,275

[22] Filed: May 10, 1991

[51] Int. Cl.[5] .................... B23Q 3/02

[52] U.S. Cl. .................... 269/32; 269/137; 269/138

[58] Field of Search .................... 269/25, 27, 32, 137, 269/138, 233

[56] References Cited

U.S. PATENT DOCUMENTS

| | | | |
|---|---|---|---|
| 2,313,843 | 3/1943 | Shaff | 269/32 |
| 2,373,384 | 4/1945 | Cross et al. | 269/138 |
| 4,410,169 | 10/1983 | Swenson | 269/138 |

*Primary Examiner*—J. J. Swann
*Attorney, Agent, or Firm*—Lloyd M. Forster

[57] ABSTRACT

A fluid pressure actuated edge clamp employing inclined guide tracks for a clamp jaw advanced and retracted by linkage which substantially eliminates side loading of the piston from reaction loads during clamp engagement. The linkage is reaches an aligned end position with the piston rod in clamping position and to accelerate advance and retraction of the clamp jaw in moving to and from clamping engagement.

1 Claim, 3 Drawing Sheets

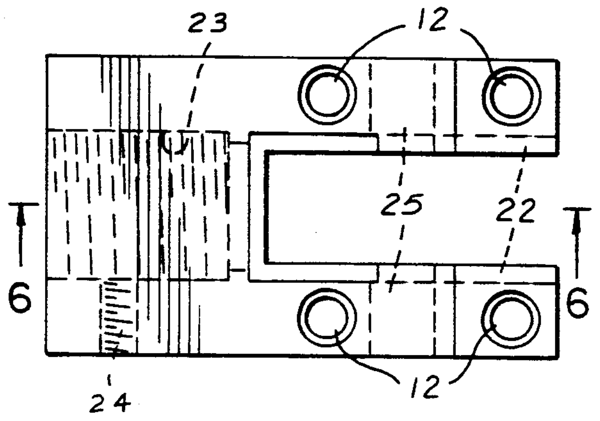
FIG.5
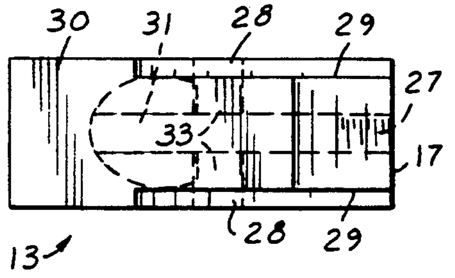
FIG.7
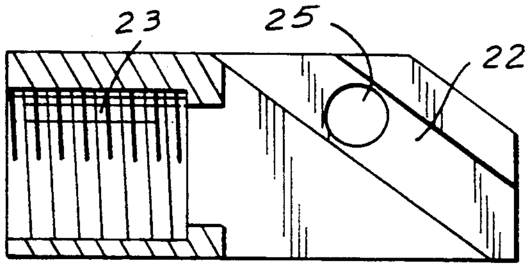
FIG.6
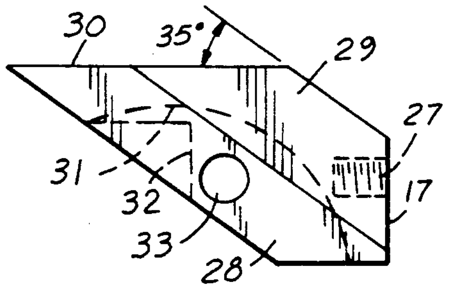
FIG.8
FIG.9
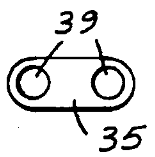
FIG.10
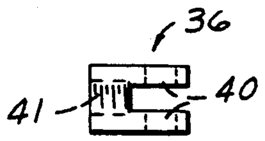

EDGE CLAMP

BACKGROUND OF THE INVENTION

Hydraulic tool or edge grip clamps are known in the art, such as disclosed in U.S. Pat. Nos. 4,406,445 dated Sep. 22, 1983 and 4,410,169 dated Oct. 18, 1983. In the first of such patents the toe member of a low-profile toe clamp is advanced down an incline at the working end of the clamp by a pair of horizontal hydraulic pistons, one on each side of the hold-down slot of the clamp. The toe member is provided with transverse pins which are overridenly engaged by inclined faces on the pistons, so that the horizontal movement of the pistons is translated to the inclined movement of the toe member and so that a stopping action is provided by eventual engagement of the pistons with the toe member. Retraction is effected by a compression spring reacting between the toe member and the clamp body.

The second of such patents discloses a work holding clamp with double-acting hydraulically actuated jaw, wherein the forward end of the body member has a formed dovetail in which moves a jaw member at a selected slant or slope. Within the body member is a reciprocal hydraulic piston having its forward end formed with two cam surfaces. A lower cam surface is adapted to engage a mating cam surface on the jaw to move the jaw member forwardly and downwardly to a gripping condition. An actuation of the piston rearwardly causes an upper cam surface to engage a removable pin to move the upper jaw member upwardly and rearwardly to disengage the jaw member from the workpiece.

In each of the foregoing Patents, inclined cam surfaces of constant angle are employed in advancing the clamping jaw to workpiece engaging position, with reaction forces imposing a corresponding side loading component on the actuating piston which contributes to frictional resistance and wear on the bearing surfaces of such piston.

BRIEF DESCRIPTION OF THE PRESENT INVENTION

A linkage system is provided in the actuating mechanism for advancing and retracting a clamp jaw along inclined guides in the clamp body, such that in the clamping position, the linkage reaches a substantially linear alignment with the actuating piston which virtually avoids any side loading on the piston. Such linkage is also effective to accelerate advance and retraction of the clamping jaw during its travel along guide tracks without clamping load, thereby minimizing the stroke of the piston between clamping and release positions.

BRIEF DESCRIPTION OF THE DRAWINGS

FIG. 5 is a plan view of the edge clamp body per se;

FIG. 6 is a sectional view taken along the line 6—6 of FIG. 5;

FIG. 7 is a plan view of the clamp jaw per se;

FIG. 8 is a side elevation of the clamp jaw per se;

FIG. 9 is a side elevation of an actuating link of the clamp;

FIG. 10 is a plan view of a clevis connecting element employed in the clamp;

DETAILED DESCRIPTION OF PREFERRED EMBODIMENT

Figure 1:
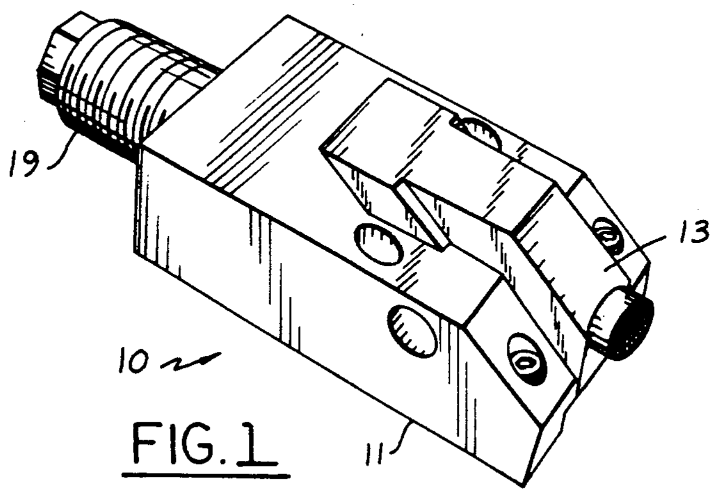
FIG. 1 is a perspective view of an edge clamp constructed in accordance with the present invention.

With reference to FIGS. 1–4, edge clamp assembly 10 is provided with planar bottom surface 11 adapted for mounting on a planar support surface by bolts, not shown, passing through four bolt holes 12 to engage four matching threaded holes in the support surfaces. Clamp jaw 13 moves from a retracted position, shown in phantom at 14, to a clamping position shown in full line along a diagonal linear path 15 extending at a 35° angle to the horizontal support surface 11. Removable standard gripper 16 is attached to end face 17 of jaw 13 by threaded connection 18. Hydraulic actuator 19 is mounted on clamp body 20 by threaded attachment, as illustrated in other figures.

In clamping position, the top of jaw 13 is flush with top surface 21 of clamp body 20 and fully protects the clamp assembly against intrusion of chips or other foreign material from above.

With reference to FIGS. 5 and 6, clamp body 20 is constructed in the form of a rectangular yoke having a through jaw opening. Linear diagonal guide slots 22 on each side of the jaw opening extend at said 35° angle to horizontal bottom surface. Tapped hole 23 is provided for mounting hydraulic actuator 19, as well as tapped set screw hole 24. Crosspin assembly holes 25 are provided for link pin, further described in connection with other drawing figures.

Figure 2:
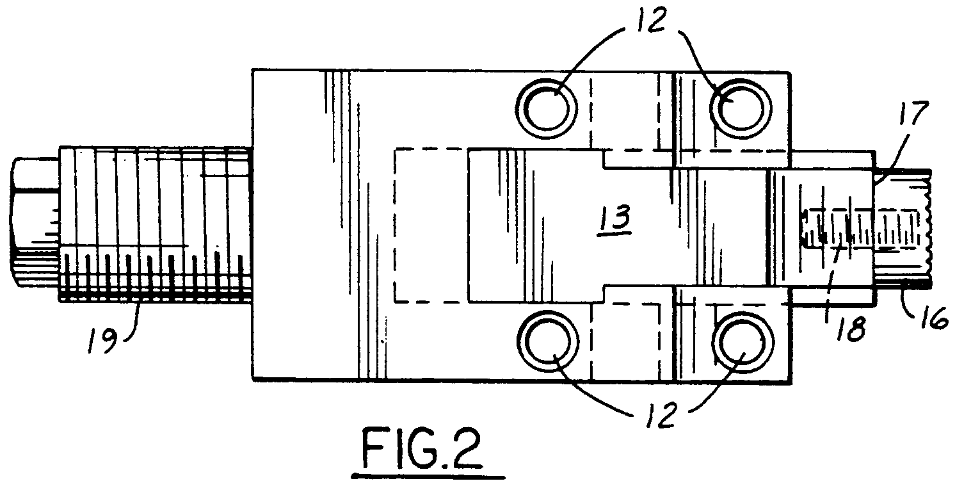
FIG. 2 is a plan view of the edge clamp.
Figure 3:
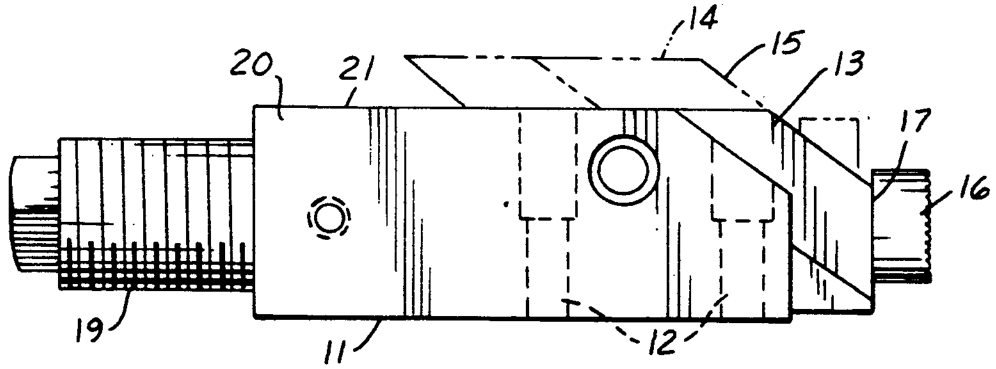
FIG. 3 is a side elevation of the edge clamp.
Figure 4:
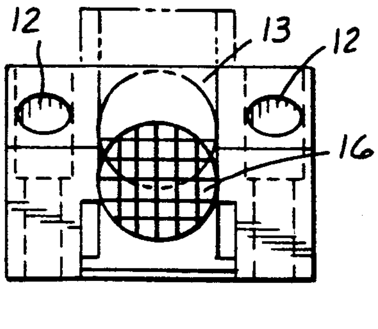
FIG. 4 is a front elevation of the edge clamp.

Referring to FIGS. 7 and 8, edge grip jaw 13 comprises essentially a trapezoidal element having a 35° acute angle matching linear guide slots 22 in body 20, and having a squared off gripper mounting face 17 with a tapped gripper mounting screw hole 27. Slot engaging rails 28 are formed by milling side surfaces 29 leaving an upper face 30 substantially flush with the upper surface of body 20 in the clamping position as illustrated in FIGS. 2 and 3. Central slot 31 is cut with a circular mill cutter, e.g., 2½" diameter, providing clearance for the connecting link as described hereafter, and further relief is provided at 32 for a clevis connection to such link. Transverse hole 33 is provided for link connecting pin 34, shown in FIGS. 11 and 12.

Figure 11:
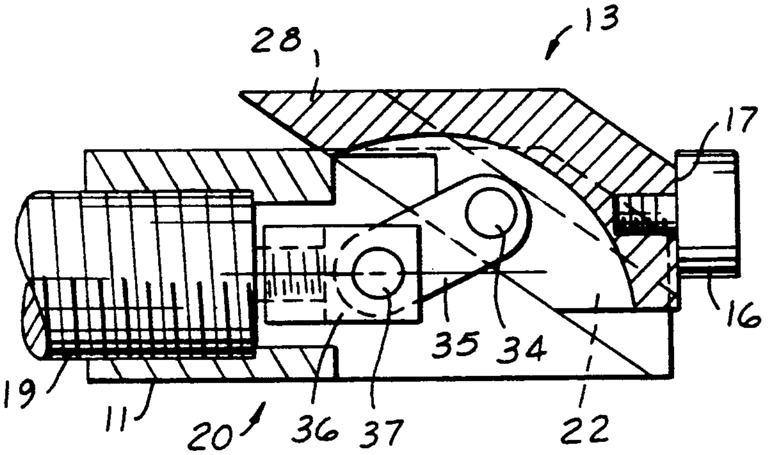
FIG. 11 is a sectional side elevation of the clamp assembly shown in retracted position.
Figure 12:
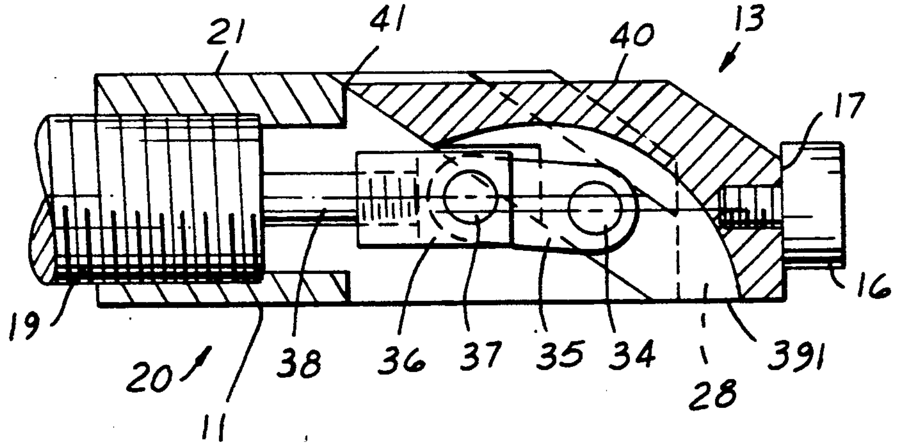
FIG. 12 is a sectional side elevation of the clamp assembly shown in clamping position.

As shown in FIGS. 11 and 12, link 35 is connected to clevis 36 by pin 37 and by rod 38 to hydraulic power actuator 19. As further clarified in the detail FIGS. 9 and 10, link 35 is provided with apertures 39 for respective connecting pins 34 and 37 and clevis 36 is provided with through aperture 40 for connecting pin 37 as well as threaded aperture 41 for connecting rod 38.

In assembling the edge clamp, link 35 is preassembled to clevis 36 with connecting pin 37, followed by mounting hydraulic cylinder 19 in body 20, and then aligning an aperture 39 for connecting pin 34 with the access holes 25 in body 20 and aperture 33 in clamp jaw 13 in order to accommodate insertion of connecting pin 34 to a central clearance position relative to the jaw opening in body 20.

In operation, retraction of clamp jaw 13 is restricted by a stop in hydraulic cylinder 19, not shown, at a non-binding angle relative to the 35° diagonal guide slots 22, e.g., 27° relative to base surface 11, so that forward clamping motion of piston rod 38 will produce an accelerated movement of clamp jaw 13 down guide ramps 22, comprising the sum of the horizontal movement of piston rod 38 and the horizontal relative component of connecting pin 34, the latter reaching a 0 value as link 35 reaches alignment with piston rod 38 corresponding to a position where full pressure of hydraulic cylinder 19 can be exerted on edge gripper 16. Likewise, in retracting edge gripper 16, accelerated travel of jaw 13 will be produced by the sum of the linear retraction of piston rod 38 and the horizontal retraction component of connecting pin 34 in moving up the 35° incline.

It will be clear from the foregoing description that confinement of linkage slot 31 in clamp jaw 13 to the circular arc shown in FIGS. 8, 11 and 12, together with extension of upper surface 30 of clamp jaw 13 to a covering relation with the jaw clevis opening of body 20 when the clamp is in edge clamping position, as illustrated in FIGS. 2, 3, and 12, results in a flush-full coverage of the jaw opening in body 20 in order to seal the clamp against intrusion of chips or other foreign material.

It will be noted in FIG. 12 that link 35 extends at a slight downward angle relative to the centerline of piston 38 when clamp jaw 13 is at maximum extension with its lowermost surface 391 flush with bottom surface 11 of clamp body 20. At this time, upper surface 401 of jaw 13 is slightly below top surface 21 of body 20, while nevertheless sealing the jaw opening in body 20, as indicated at the trailing edge 411 of jaw 13. Such sealing prevails throughout retraction of jaw 13 as evident at the extremity position shown at FIG. 11. The slight differential in the relative thickness of body 20 and jaw 13, corresponds to a linear clamping range, typically in the order of 3/16 of an inch. Within this range, link 35 extends in a virtually horizontal direction aligned with piston rod 38 thereby minimizing any side loading force component on piston rod 38 and maximizing linear clamping force to substantially equal full effective piston thrust of hydraulic cylinder 19. Retraction of clamp jaw 13 is effected by piston rod 38, either through a spring return or double-acting hydraulic piston.

I claim:

1. An edge clamp comprising a clamp body mountable on a support surface and having a top surface, said clamp body including inclined linear guide means inclined relative to said support surface, clamp jaw means having a top surface and reciprocally guided on said body along said inclined linear guide means, linear fluid pressure actuating means having a longitudinal axis and mounted on said body and actuatable to move in parallel relation to said support surface, linkage means comprising a single connecting link extending between said actuating means and said jaw means and having two spaced pivots having axes parallel to each other and transverse to the longitudinal axis of said actuating means, and said linkage means advancing and retracting said jaw means to and from a clamping position in which the top surface of said jaw means is flush with the top surface of said clamp body, wherein said longitudinal axis of said actuating means intersects the axes of both said pivots upon reaching said clamping position.

* * * * *